United States Patent
Howe-Ryberg et al.

(10) Patent No.: US 9,420,620 B2
(45) Date of Patent: Aug. 16, 2016

(54) SYSTEMS AND METHODS FOR AIRCRAFT ON-GROUND DETERMINATION

(71) Applicant: Honeywell International Inc., Morristown, NJ (US)

(72) Inventors: Sandra J. Howe-Ryberg, Renton, WA (US); Darshan Gandhi, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 4 days.

(21) Appl. No.: 14/501,454

(22) Filed: Sep. 30, 2014

(65) Prior Publication Data

US 2016/0095150 A1  Mar. 31, 2016

(51) Int. Cl.

| | |
|---|---|
| *H04B 1/38* | (2015.01) |
| *H04W 76/02* | (2009.01) |
| *H04W 4/00* | (2009.01) |
| *H04W 4/02* | (2009.01) |
| *H04W 4/04* | (2009.01) |
| *H04L 29/08* | (2006.01) |
| *H04W 88/16* | (2009.01) |

(52) U.S. Cl.
CPC ............. *H04W 76/025* (2013.01); *H04L 67/12* (2013.01); *H04W 4/005* (2013.01); *H04W 4/027* (2013.01); *H04W 4/046* (2013.01); *H04W 88/16* (2013.01)

(58) Field of Classification Search
CPC ... H04W 76/025; H04W 4/005; H04W 88/16; H04W 4/046; H04W 76/02
USPC ................ 455/431, 90.3, 411, 430, 11.1, 12.1
See application file for complete search history.

(56) References Cited

U.S. PATENT DOCUMENTS

| | | | |
|---|---|---|---|
| 6,181,990 B1 | 1/2001 | Grabowsky et al. | |
| 6,965,753 B1 * | 11/2005 | Miller ...................... | H04B 7/01 367/90 |
| 7,460,830 B2 * | 12/2008 | Moore, III ......... | H04B 7/18521 455/13.2 |

(Continued)

FOREIGN PATENT DOCUMENTS

EP  2040392  3/2009

OTHER PUBLICATIONS

European Patent Office, "Extended European Search Report from EP Application No. 15187004.5 mailed Jan. 12, 2016", "from Foreign Counterpart of U.S. Appl. No. 14/501,454", Jan. 12, 2016, pp. 1-9, Published in: EP.

*Primary Examiner* — Marceau Milord
(74) *Attorney, Agent, or Firm* — Fogg & Powers LLC

(57) ABSTRACT

Systems and methods for aircraft on-ground determination are provided. In one embodiment, an onboard motion controlled wireless avionics datalink gateway comprises: a wireless radio chipset module; and a velocity interlock coupled to an aircraft motion sensor and the wireless radio chipset module. The wireless radio chipset module is configured to establish one or more intra-aircraft radio communication links with one or more onboard avionics system, and wherein the wireless radio chipset module is configure to establish one or more external radio communication links with at least one ground-based wireless communication system. The aircraft motion sensor is configured to output to the velocity interlock an aircraft motion signal indicative of a velocity of an aircraft in which the gateway is installed. The velocity interlock enables and disables the one or more intra-aircraft radio communication links and the one or more external radio communication links based on the aircraft motion signal.

19 Claims, 4 Drawing Sheets

(56) References Cited

U.S. PATENT DOCUMENTS

| | | | | |
|---|---|---|---|---|
| 7,715,853 B1* | 5/2010 | Frerking | | H04B 7/18506 370/315 |
| 7,835,734 B2* | 11/2010 | Eckert | | H04B 7/18506 340/945 |
| 8,351,926 B1 | 1/2013 | Wright et al. | | |
| 8,787,246 B2* | 7/2014 | Brownrigg | | H04B 7/18584 370/316 |
| 8,872,674 B1* | 10/2014 | Subramanya | | G01S 7/2926 340/931 |
| 9,026,279 B2* | 5/2015 | Ziarno | | G05B 23/0213 701/14 |
| 9,083,425 B1* | 7/2015 | Frolov | | H04B 7/18504 |
| 9,141,830 B2* | 9/2015 | Uczekaj | | H04L 67/12 |
| 9,197,314 B1* | 11/2015 | Lauer | | H04B 7/18506 |
| 2005/0286452 A1 | 12/2005 | Hardgrave et al. | | |
| 2007/0072639 A1 | 3/2007 | Frost et al. | | |
| 2008/0252459 A1* | 10/2008 | Butler | | G06K 7/0008 340/572.1 |
| 2009/0315704 A1* | 12/2009 | Rosing | | G06Q 10/08 340/539.13 |
| 2010/0097208 A1* | 4/2010 | Rosing | | G06Q 10/087 340/539.13 |
| 2011/0202225 A1* | 8/2011 | Willis | | G01C 21/165 701/31.4 |
| 2013/0197725 A1* | 8/2013 | O'Dell | | B64F 5/0045 701/14 |
| 2013/0201316 A1* | 8/2013 | Binder | | H04L 67/12 348/77 |
| 2014/0143839 A1* | 5/2014 | Ricci | | H04W 12/06 726/4 |

\* cited by examiner

SYSTEMS AND METHODS FOR AIRCRAFT ON-GROUND DETERMINATION

BACKGROUND

Although modern aircraft have multiple options for establishing air-to-ground data links during flight, there remain certain communications activities that may only be performed when an aircraft is on the ground. One current method for managing radios used for such communications is to enable or disable the radios based on the state of an interlock activated by one or more aircraft components. For example, the opening or closing of aircraft doors may be monitored by a sensor and used as a proxy to determine whether the aircraft is on the ground. Similarly, a weight sensor on an aircraft's landing gear can be used determine whether the full weight of the aircraft is on the landing gear, and also used as a proxy to determine whether the aircraft is on the ground.

One issue with these approaches is that regulating bodies continue to broaden the circumstance under which data can be transmitted using, for example, cellular or IEEE 802.11 (Wi-Fi) datalinks. Further, aircraft operators want to take advantage of the full window of time they have to exchange data between the aircraft's avionics systems and the ground based systems. Because turnaround times are fast, the time available for performing downloads and uploads while the aircraft is on the ground is a valuable resource. Therefore, aircraft operators want a more intelligent way of identifying when an aircraft is on the ground or airborne for the purpose of enabling these ground-use only datalink radios.

For the reasons stated above and for other reasons stated below which will become apparent to those skilled in the art upon reading and understanding the specification, there is a need in the art for improved systems and methods for aircraft on-ground determination.

SUMMARY

The Embodiments of the present invention provide methods and systems for aircraft on-ground determination and will be understood by reading and studying the following specification.

In one embodiment, an onboard motion controlled wireless avionics datalink gateway comprises: a wireless radio chipset module; and a velocity interlock coupled to an aircraft motion sensor and the wireless radio chipset module; wherein the wireless radio chipset module is configured to establish one or more intra-aircraft radio communication links with one or more onboard avionics system, and wherein the wireless radio chipset module is configure to establish one or more external radio communication links with at least one ground-based wireless communication system; wherein the aircraft motion sensor is configured to output to the velocity interlock an aircraft motion signal indicative of a velocity of an aircraft in which the gateway is installed; and wherein the velocity interlock enables and disables the one or more intra-aircraft radio communication links and the one or more external radio communication links based on the aircraft motion signal.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide an intelligent way of identifying when an aircraft is on the ground or airborne for the purpose of enabling onboard ground-use only datalink radios through the use of motion sensors embedded within the radio units. With embodiments of the present disclosure, an aircraft's velocity, as determined by the radio units themselves, is utilized to determine whether an aircraft is airborne or on the ground. As will be explained in greater detail below, this determination may be based on sensors integrated into the radio unit itself, or from sensors external to the radio unit. For example, in one embodiment, a radio unit includes a configuration file that describes certain aircraft dynamics and parameters tailored to the specific aircraft in which the radio unit is installed. From the information provided in that configuration file, and data capture by the motion sensors, the radio can determine if the aircraft has exceeded its takeoff speed and is therefore airborne, or if the aircraft is moving at a speed below which it can maintain itself in the air, and is therefore on the ground. In this way, embodiments of the present disclosure can determine what phase of flight an aircraft is in and from that make a determination as to whether a radio can be activated for exchanging data with ground systems. This permits aircraft operators to take advantage of every second in which the aircraft is truly not in flight to exchange data.

Figure 1:
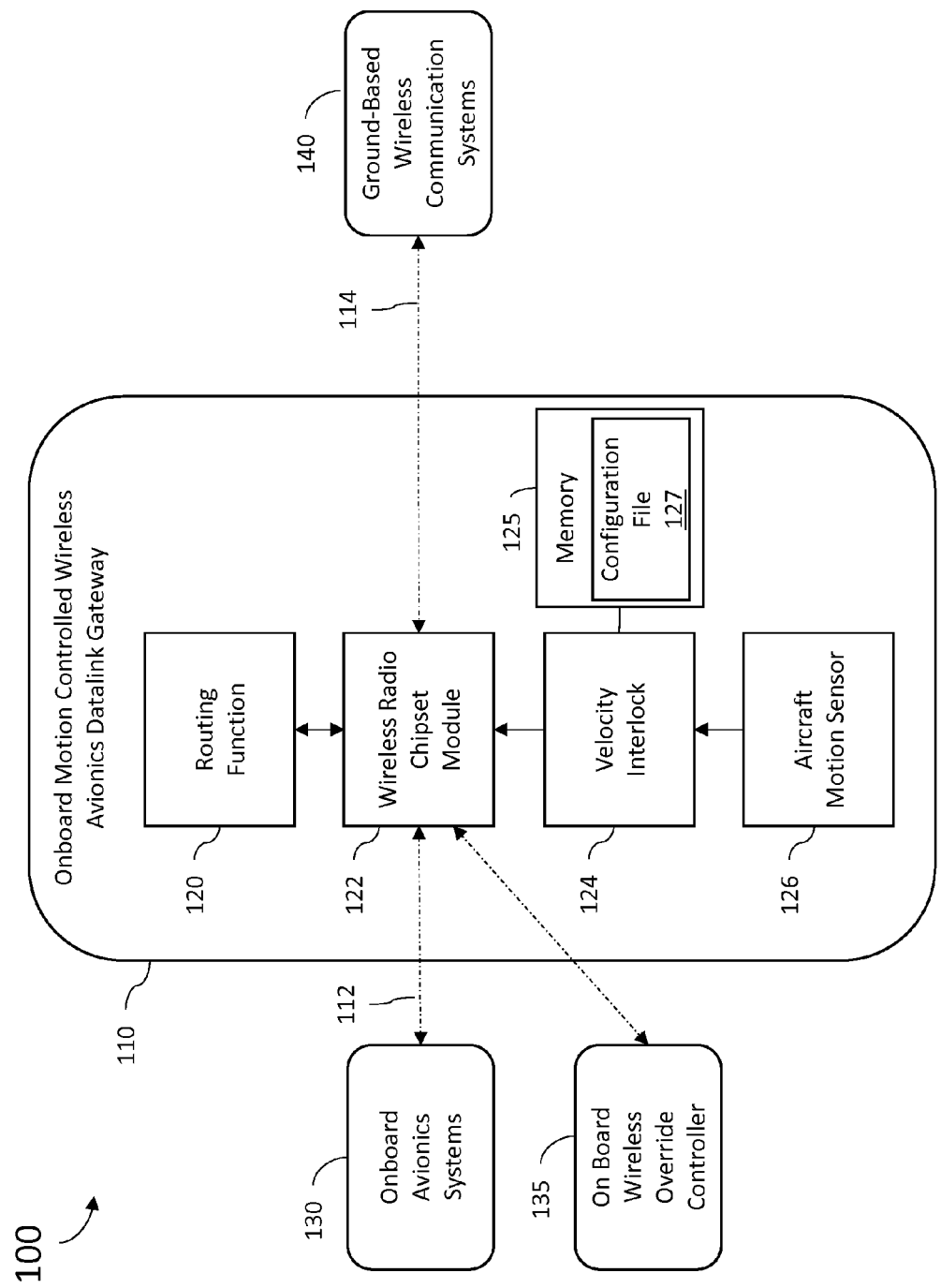
FIG. 1 is a diagram illustrating an onboard notion controlled wireless avionics datalink gateway of one embodiment of the present disclosure.

FIG. 1 is a block diagram illustrating generally at 100 a radio unit of one embodiment of the present invention referred to herein as an onboard motion controlled wireless avionics datalink gateway 110. Gateway 120 comprises a wireless radio chipset module 120 coupled to a routing function 120, a velocity interlock 126 and an aircraft motion sensor 126. Wireless radio chipset module 120 includes functionality for establishing intra-aircraft radio communication links 112 with one or more onboard avionics system 130 and external radio communication links 114 with at least one Ground-Based Wireless Communication System 140 using one or more standard wireless protocols such as but not limited to 3G, 4G or Long-Term-Evolution (LTE) based cellular standards, IEEE 802.11 or IEEE 802.16, or other broadband wireless standards. Routing function 120 works in coordination with wireless radio chipset module 120 to direct data packets or streams between source and destination devices coupled to each other by communication links 112 and 114. In some embodiments, routing function 120 may operate, for example, as an Open Systems Interconnection (OSI) Level 2 or Level 3 device that direct data packets transported by links 112 and 114. In one embodiment, router function 120 establishes a secure communications routing for official aircraft data and systems via an avionics communication domain within the aircraft as opposed to a passenger accessible communications domain. Information exchanged via gateway 110 between onboard avionics systems 130 and ground based systems 140 may include, but are not limited to, aircraft maintenance data, weather data, flight connection information, uploads to pilot electronic flight bags, flight recorder data, or the like.

Figure 1A:
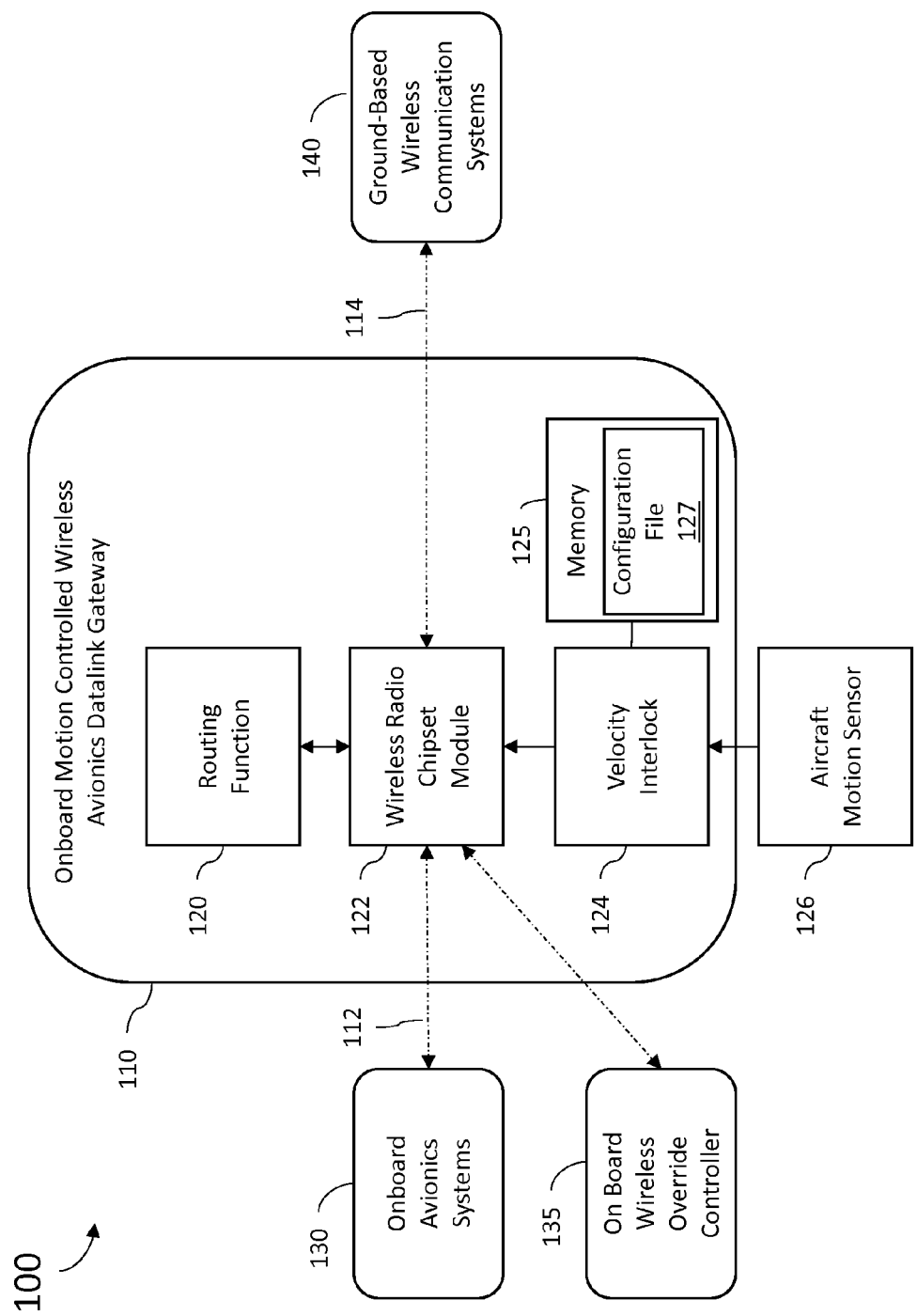
FIG. 1A is a is a diagram illustrating an onboard notion controlled wireless avionics datalink gateway of another embodiment of the present disclosure.

In various alternate embodiments, aircraft motion sensor 126 may comprise inertial navigation sensors (such as accelerometers or gyroscopes), global navigation satellite system (GNSS) receivers, or some combination thereof. Aircraft motion sensor 126 is configured to output to velocity interlock 124 an aircraft motion signal indicative of the velocity of the aircraft. From this signal, velocity interlock 124 calculates the forward velocity of the aircraft. For example, in one embodiment aircraft motion sensor 126 outputs aircraft position measurements to velocity interlock 124, from which the velocity interlock 124 estimates a rate of speed (i.e., velocity). In one embodiment, these measurements are augmented by inertial data from aircraft motion sensor 126 to increase the accuracy of the velocity estimates. For example, accelerometer data from aircraft motion sensor 126 may be used to determine whether the aircraft is speeding up or slowing down with respect to the forward direction of the aircraft. In the embodiment shown in FIG. 1, aircraft motion sensor 126 is integral to gateway 110. However, in other embodiments such as shown in FIG. 1A, aircraft motion sensor 126 may comprise a component external to gateway 110.

In some embodiments, gateway 110 may be physically implemented as a line replaceable unit (LRU) or other rack mounted installation, but in other embodiment, other form factors may be utilized.

In operation, velocity interlock 124 will then use these velocity estimates to enable or disable communication links 112 and 114 via wireless radio chipset module 122. In one embodiment, the actual aircraft speed (as estimated from data provided by aircraft motion sensor 126) is compared to predetermined speed thresholds based on aircraft dynamics. That is, these thresholds for activating or deactivating communication links 112 and 114 are determined from the known minimum takeoff speed, and maximum landing speed, for the particular aircraft in which gateway 110 is installed. When the estimated aircraft velocity is below a first threshold (referred to as an on-ground threshold), that means the aircraft is necessarily on-ground and wireless radio chipset module 122 may be activated to enable communication links 112 and 114. When the estimated aircraft velocity exceeds a second threshold (referred to as a takeoff threshold), that means the aircraft should be airborne and wireless radio chipset module 122 must be deactivated to disable communication links 112 and 114. As such, gateway 110 can enable the wireless radio communication as soon as the aircraft lands and turn off the wireless radio communication just prior to when the aircraft reaches take-off speed. In some embodiments, velocity interlock 124 locks out power to wireless radio chipset module to ensure that the wireless radio functionality is disabled whenever velocity interlock 124 cannot definitively determine that the aircraft is not airborne. Because gateway 110 is able to self-determine whether the aircraft is airborne or has landed, the device is ideal for retrofit applications because it is not necessary to re-wire an aircraft to provide gateway 110 with access to the aircraft's native on-board navigation avionics.

In some embodiments, the aircraft may further include an on-board wireless override controller 135. If for whatever reason gateway 110 remains enabled after takeoff, or errantly becomes enabled during flight, the pilot may use controller 135 to send a wireless command to lockout power to gateway 110 or otherwise disable module 122. In one embodiment, controller 135 further includes a monitoring function that monitors for transmissions from gateway 110 and indicates to the pilot with gateway 110 is enabled.

As mentioned above, velocity interlock 124 compares the estimated aircraft speed to predetermined speed thresholds based on aircraft dynamics in order to make the determination as to whether the aircraft is on the ground or airborne. Therefore, in some embodiments, gateway 110 further includes a memory 125 storing a configure file 127 that is customized to the particular aircraft type. For example, in one embodiment, when gateway 110 is installed in an aircraft, the maintenance technicians will load memory 125 with the appropriate configuration file 127 corresponding to that aircraft. The configuration file 127 can include the predetermined speed thresholds used by velocity interlock 124. In alternate implementations, the configuration file 127 can be loaded into memory 125 wirelessly (using for example, one of wireless links 114) or via a physical port.

Figure 2:
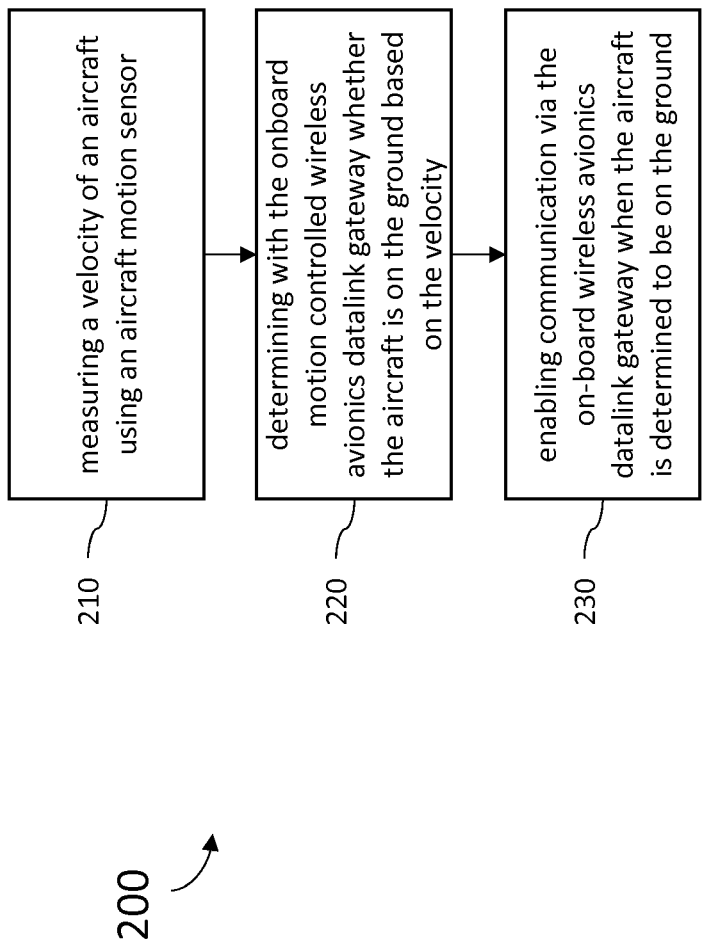
FIG. 2 is a flow chart illustrating a method of one embodiment of the present disclosure.

FIG. 2 provides a flow chart at 200 broadly summarizing the method of operation of an onboard motion controlled wireless avionics datalink gateway 110. Method 200 comprises: measuring a velocity of an aircraft using an aircraft motion sensor (at 210), determining with the onboard motion controlled wireless avionics datalink gateway whether the aircraft is on the ground based on the velocity (at 220), and enabling communication via the on-board wireless avionics datalink gateway when the aircraft is determined to be on the ground (at 230).

Figure 3:
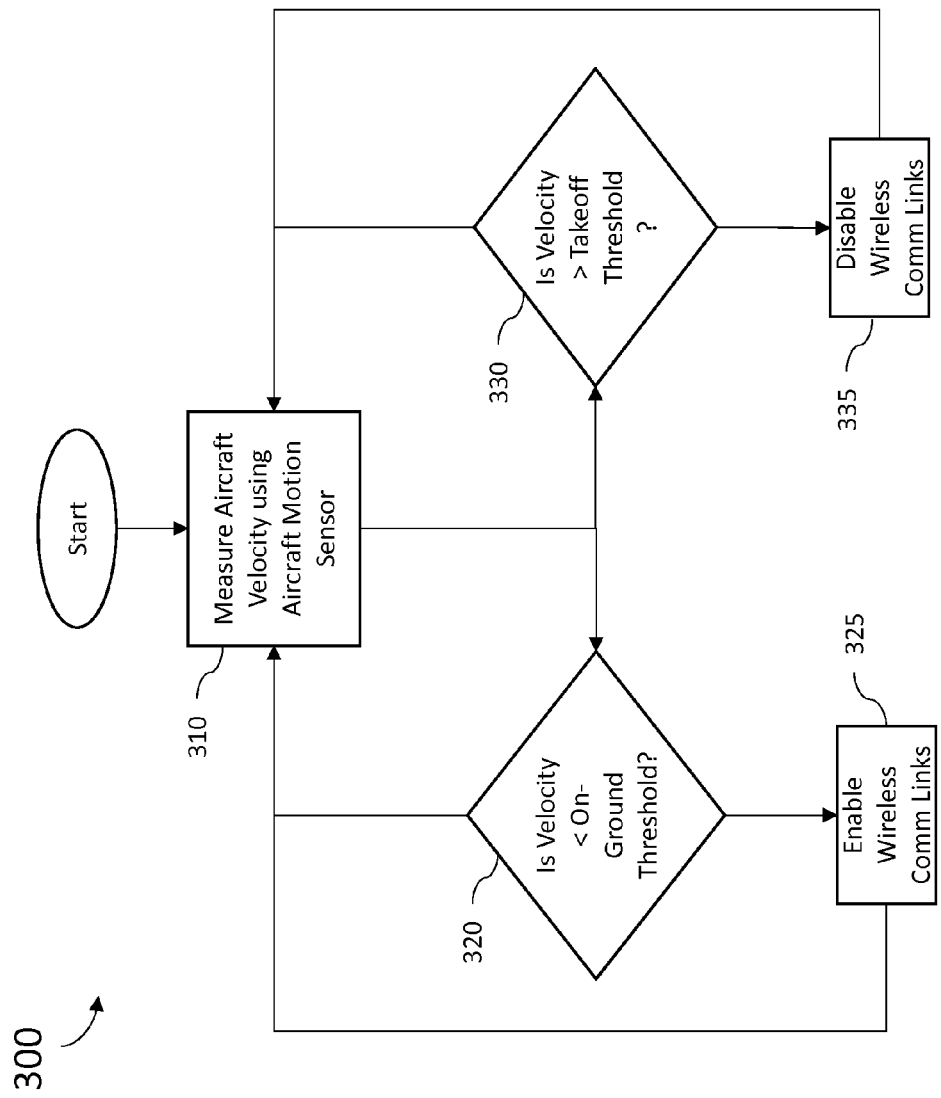
FIG. 3 is a flow chart illustrating another method of one embodiment of the present disclosure.

FIG. 3 is a flow chart illustrating a method 300 providing expanded details of the method shown in FIG. 2. In one embodiment, method 300 may be implemented using an onboard motion controlled wireless avionics datalink gateway such as described in FIG. 1 or 1A above. The method begins at 310 with measuring an aircraft velocity using an aircraft motion sensor. In various embodiments, measuring an aircraft velocity using an aircraft motion sensor may be performed by using inertial navigation sensors (such as accelerometers or gyroscopes), global navigation satellite system (GNSS) receivers, or some combination thereof. In some embodiments, the aircraft motion sensor outputs aircraft position measurements from which a rate of speed (i.e., velocity) of the aircraft may be estimated. The method may also include augmenting the position measurements with inertial data to increase the accuracy of the velocity estimates. The aircraft motion sensor may be is integral to the onboard motion controlled wireless avionics datalink gateway or may comprise a component external to the gateway.

When the aircraft velocity is determined to be less than an on-ground threshold (shown at 320), the method proceeds to 325 with enabling a set of wireless communication links. When the aircraft velocity is determined to be greater than a takeoff threshold (shown at 330), the method proceeds to 335 with disabling the set of wireless communication links. The aircraft speed, as estimated from the measurements at block 310, is compared to predetermined speed thresholds determined from the known minimum takeoff speed, and maximum landing speed, for the particular aircraft in which method 300 is performed. When the estimated aircraft velocity is below the on-ground threshold, that means the aircraft is necessarily on-ground and the wireless communication links may be enabled. When the estimated aircraft velocity exceeds the takeoff threshold, that means the aircraft should be airborne and the wireless communication links should be disabled. As such, method 300 can enable the wireless radio communication as soon as the aircraft lands and turn off the wireless radio communication just prior to when the aircraft reaches take-off speed.

Example Embodiments

Example 1 includes an onboard motion controlled wireless avionics datalink gateway, the gateway comprising: a wireless radio chipset module; and a velocity interlock coupled to an aircraft motion sensor and the wireless radio chipset module; wherein the wireless radio chipset module is configured to establish one or more intra-aircraft radio communication links with one or more onboard avionics system, and wherein the wireless radio chipset module is configure to establish one or more external radio communication links with at least one ground-based wireless communication system; wherein the aircraft motion sensor is configured to output to the velocity interlock an aircraft motion signal indicative of a velocity of an aircraft in which the gateway is installed; and wherein the velocity interlock enables and disables the one or more intra-aircraft radio communication links and the one or more external radio communication links based on the aircraft motion signal.

Example 2 includes the gateway of example 1, further comprising: a routing function coupled to the wireless radio chipset module; wherein the routing function directs data between source and destination devices coupled to each other by the one or more intra-aircraft radio communication links and the one or more external radio communication links.

Example 3 includes the gateway of examples 2, wherein the routing function operates as an Open Systems Interconnection (OSI) Level 2 or OSI Level 3 device to direct data packets transported between the one or more intra-aircraft radio communication links and the one or more external radio communication links.

Example 4 includes the gateway of any of examples 2-3, wherein the routing function establishes a secure communications routing for official aircraft data and systems via an avionics communication domain within the aircraft isolated from a passenger accessible communications domain.

Example 5 includes the gateway of any of examples 1-4, wherein the one or more external radio communication links are configured based on one or more of a cellular communication standard or a broadband wireless communication standard.

Example 6 includes the gateway of any of examples 1-5, wherein the aircraft motion sensor comprises either an inertial navigation sensor, a global navigation satellite system (GNSS) receiver, or both.

Example 7 includes the gateway of any of examples 1-6, wherein the velocity interlock compares a velocity determined from the aircraft motion signal against predetermined speed thresholds to determine when to enable and disable the one or more intra-aircraft radio communication links.

Example 8 includes the gateway of example 7, further comprising a memory with a configuration file, wherein the predetermined speed thresholds are stored in the configuration file.

Example 9 includes the gateway of any of examples 7-8, wherein when the velocity determined from the aircraft motion signal exceeds a takeoff threshold, the velocity interlock disables the one or more intra-aircraft radio communication links.

Example 10 includes the gateway of any of examples 7-9, wherein when the velocity determined from the aircraft motion signal is below an on-ground threshold, the velocity interlock enables the one or more intra-aircraft radio communication links.

Example 11 includes the gateway of any of examples 1-10, wherein the velocity interlock locks out power to the wireless radio chipset module to disables the one or more intra-aircraft radio communication links.

Example 12 includes the gateway of any of examples 1-11, wherein the aircraft motion sensor is integral to the gateway with the velocity interlock and the wireless radio chipset module.

Example 13 includes a method for operating an onboard motion controlled wireless avionics datalink gateway, method comprising: measuring a velocity of an aircraft using an aircraft motion sensor; determining with the onboard motion controlled wireless avionics datalink gateway whether the aircraft is on the ground based on the velocity; and enabling communication via the on-board wireless avionics datalink gateway when the aircraft is determined to be on the ground.

Example 14 includes the method of example 13, further comprising: when the aircraft velocity is determined to be less than an on-ground threshold, enabling a set of wireless communication links; and when the aircraft velocity is determined to be greater than a takeoff threshold, disabling the set of wireless communication links.

Example 15 includes the method of example 14, wherein the on-ground threshold and the takeoff threshold are determined based on data contained in a configuration file, where the configuration file is stored in a memory within the onboard motion controlled wireless avionics datalink gateway.

Example 16 includes the method of any of examples 14-15, wherein the onboard motion controlled wireless avionics datalink gateway comprises a wireless radio chipset module, wherein enabling the set of wireless communication links and disabling the set of wireless communication links comprise controlling power to the wireless radio chipset module.

Example 17 includes the method of any of examples 14,-16 wherein the set of wireless communication links comprise one or both of cellular communication links or broadband wireless communication links.

Example 18 includes the method of any of examples 13-17, when the set of wireless communication links is enabled, the method further comprising, via the on-board wireless avionics datalink gateway: establishing one or more intra-aircraft radio communication links with one or more onboard avionics system; establishing one or more external radio communication links with at least one ground-based wireless communication system; and directing data between source and destination devices coupled to each other by the one or more intra-aircraft radio communication links and the one or more external radio communication links.

Example 19 includes the method of any of examples 13-18, wherein the aircraft motion sensor comprises either an inertial navigation sensor, a global navigation satellite system (GNSS) receiver, or both.

Example 20 includes the method of any of examples 13-19, wherein the aircraft motion sensor is integral to the onboard motion controlled wireless avionics datalink gateway.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An onboard motion controlled wireless avionics datalink gateway, the gateway comprising: a wireless radio chipset module; an aircraft motion sensor integral within the onboard motion controlled wireless avionics datalink gateway; and a velocity interlock coupled to the aircraft motion sensor and the wireless radio chipset module; wherein the wireless radio chipset module is configured to establish one or more intra-aircraft radio communication links with one or more onboard avionics system, and wherein the wireless radio chipset module is configure to establish one or more external radio communication links with at least one ground-based wireless communication system; wherein the aircraft motion sensor is configured to output to the velocity interlock an aircraft motion signal indicative of a velocity of an aircraft in which the gateway is installed; and wherein the velocity interlock enables and disables the one or more intra-aircraft radio communication links and the one or more external radio communication links based on the aircraft motion signal.

2. The gateway of claim 1, further comprising:
a routing function coupled to the wireless radio chipset module;
wherein the routing function directs data between source and destination devices coupled to each other by the one or more intra-aircraft radio communication links and the one or more external radio communication links.

3. The gateway of claim 2, wherein the routing function operates as an Open Systems Interconnection (OSI) Level 2 or OSI Level 3 device to direct data packets transported between the one or more intra-aircraft radio communication links and the one or more external radio communication links.

4. The gateway of claim 2, wherein the routing function establishes a secure communications routing for official aircraft data and systems via an avionics communication domain within the aircraft isolated from a passenger accessible communications domain.

5. The gateway of claim 1, wherein the one or more external radio communication links are configured based on one or more of a cellular communication standard or a broadband wireless communication standard.

6. The gateway of claim 1, wherein the aircraft motion sensor comprises either an inertial navigation sensor, a global navigation satellite system (GNSS) receiver, or both.

7. The gateway of claim 1, wherein the velocity interlock compares a velocity determined from the aircraft motion signal against predetermined speed thresholds to determine when to enable and disable the one or more intra-aircraft radio communication links.

8. The gateway of claim 7, further comprising a memory with a configuration file, wherein the predetermined speed thresholds are stored in the configuration file.

9. The gateway of claim 7, wherein when the velocity determined from the aircraft motion signal exceeds a takeoff threshold, the velocity interlock disables the one or more intra-aircraft radio communication links.

10. The gateway of claim 7, wherein when the velocity determined from the aircraft motion signal is below an on-ground threshold, the velocity interlock enables the one or more intra-aircraft radio communication links.

11. The gateway of claim 1, wherein the velocity interlock locks out power to the wireless radio chipset module to disables the one or more intra-aircraft radio communication links.

12. The gateway of claim 1, wherein the aircraft motion sensor is integral to the gateway with the velocity interlock and the wireless radio chipset module.

13. A method for operating an onboard motion controlled wireless avionics datalink gateway, method comprising: measuring a velocity of an aircraft using an aircraft motion sensor integral within the onboard motion controlled wireless avionics datalink gateway; determining with the onboard motion controlled wireless avionics datalink gateway whether the aircraft is on the ground based on the velocity; and enabling communication via the on-board wireless avionics datalink gateway when the aircraft is determined to be on the ground; when the aircraft velocity is determined to be less than an on-ground threshold, enabling a set of wireless communication links; and when the aircraft velocity is determined to be greater than a takeoff threshold, disabling the set of wireless communication links.

14. The method of claim 13, wherein the on-ground threshold and the takeoff threshold are determined based on data contained in a configuration file, where the configuration file is stored in a memory within the onboard motion controlled wireless avionics datalink gateway.

15. The method of claim 13, wherein the onboard motion controlled wireless avionics datalink gateway comprises a wireless radio chipset module, wherein enabling the set of wireless communication links and disabling the set of wireless communication links comprise controlling power to the wireless radio chipset module.

16. The method of claim 13, wherein the set of wireless communication links comprise one or both of cellular communication links or broadband wireless communication links.

17. The method of claim 13, when the set of wireless communication links is enabled, the method further comprising, via the on-board wireless avionics datalink gateway:
establishing one or more intra-aircraft radio communication links with one or more onboard avionics system;
establishing one or more external radio communication links with at least one ground-based wireless communication system; and
directing data between source and destination devices coupled to each other by the one or more intra-aircraft radio communication links and the one or more external radio communication links.

18. The method of claim 13, wherein the aircraft motion sensor comprises either an inertial navigation sensor, a global navigation satellite system (GNSS) receiver, or both.

19. The method of claim 13, wherein the aircraft motion sensor is integral to the onboard motion controlled wireless avionics datalink gateway.

* * * * *